(12) United States Patent
Asai et al.

(10) Patent No.: US 7,652,114 B2
(45) Date of Patent: Jan. 26, 2010

(54) METHOD FOR PREPARING POLYOXYALKYLENE-ORGANO POLYSILOXANE COPOLYMERS

(75) Inventors: Mitsuo Asai, Gunma-ken (JP); Shinichi Morioka, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 654 days.

(21) Appl. No.: 11/385,785

(22) Filed: Mar. 22, 2006

(65) Prior Publication Data
US 2006/0217513 A1  Sep. 28, 2006

(30) Foreign Application Priority Data
Mar. 23, 2005  (JP) .............................. 2005-083702

(51) Int. Cl.
*C08G 77/46* (2006.01)
(52) U.S. Cl. .......................................... 528/25; 528/31
(58) Field of Classification Search ................... 528/31, 528/25
See application file for complete search history.

(56) References Cited

U.S. PATENT DOCUMENTS

| | | | |
|---|---|---|---|
| 3,159,601 A | 12/1964 | Ashby | |
| 3,159,662 A | 12/1964 | Ashby | |
| 3,220,972 A | 11/1965 | Lamoreaux | |
| 3,775,452 A | 11/1973 | Karstedt | |
| 4,847,398 A | 7/1989 | Mehta et al. | |
| 5,159,096 A | 10/1992 | Austin et al. | |
| 5,191,193 A | 3/1993 | Le Roux | |
| 5,648,444 A | 7/1997 | Austin et al. | |
| 5,869,727 A | 2/1999 | Crane et al. | |
| 5,986,022 A * | 11/1999 | Austin et al. | 526/65 |
| 5,986,122 A * | 11/1999 | Lewis et al. | 556/445 |
| 6,372,874 B1 | 4/2002 | Cameron | |

FOREIGN PATENT DOCUMENTS

| | | |
|---|---|---|
| EP | 0842964 A | 5/1998 |
| EP | 1006140 A | 6/2000 |
| JP | 11-116670 A | 4/1999 |
| JP | 11-504379 A | 4/1999 |
| JP | 2000-234025 A | 8/2000 |

OTHER PUBLICATIONS

WPI World Patent Information Derwent, GB PA-JP43008830B, 1968, XP002054875.

* cited by examiner

*Primary Examiner*—Kuo-Liang Peng
(74) *Attorney, Agent, or Firm*—Birch, Stewart, Kolasch & Birch, LLP

(57) ABSTRACT

A polyoxyalkylene-organopolysiloxane copolymer is prepared by reacting a polyoxyalkylene allyl ether with an organohydrogenpolysiloxane in the presence of a platinum group metal catalyst. In one embodiment, a polyoxyalkylene allyl ether having a CPR value of less than 0.5 is used. In another embodiment, a polyoxyalkylene allyl ether having a CPR value of less than 5 is used and an acid is added for neutralization prior to the reaction. The copolymer can be produced while substantially eliminating solvents and additives or minimizing the amounts thereof.

8 Claims, No Drawings

METHOD FOR PREPARING POLYOXYALKYLENE-ORGANO POLYSILOXANE COPOLYMERS

CROSS-REFERENCE TO RELATED APPLICATION

This non-provisional application claims priority under 35 U.S.C. §119(a) on Patent Application No. 2005-083702 filed in Japan on Mar. 23, 2005, the entire contents of which are hereby incorporated by reference.

TECHNICAL FIELD

This invention relates to a method for preparing polyoxyalkylene-organopolysiloxane copolymers useful as paint additives, polyurethane foam stabilizers, cosmetics additives, emulsifiers and the like.

BACKGROUND ART

It is well known to those skilled in the art that polyoxyalkylene-organopolysiloxane copolymers are produced through addition reaction of polyoxyalkylene allyl ethers with organohydrogenpolysiloxanes in the presence of platinum based catalysts, which reaction is commonly referred to as hydrosilylation.

The hydrosilylation reaction is generally carried out in suitable solvents for allowing the addition reaction to proceed smoothly, for example, alcohols such as ethanol and propanol and aromatic hydrocarbons such as toluene and xylene.

JP-A 11-504379 uses as the reaction medium a hydroxyl-free ester solvent which is a liquid with a high boiling point. The use of such a low volatile solvent is advantageous because it helps the hydrosilylation reaction proceed and causes no substantial change in properties of the resulting polyoxyalkylene-organopolysiloxane copolymers even when the solvent is left behind, avoiding any danger like toxicity.

JP-A 2000-234025 describes that the relevant reaction is effected in the presence or absence of a solvent while an amine is added. The amine added can prohibit side reactions particularly when the polyoxyalkylene allyl ethers are terminated with hydroxyl groups.

U.S. Pat. No. 5,869,727 (JP-A 11-116670) discloses that the relevant reaction is effected in vacuum. The vacuum condition ensures formation of a high molecular weight copolymer of $[AB]_n$ type using a platinum catalyst, hexachloroplatinic acid and can suppress foaming upon solvent stripping.

For decomposing oxidative impurities which are present in the polyoxyalkylene allyl ether and interfere with hydrosilylation, it is effective to add ascorbic acid, citric acid or derivatives thereof as disclosed in Japanese Patent No. 3299154. This method improves the reactivity of hydrosilylation, but suffers from a problem. When ascorbic or citric acid is used in an amount enough to decompose oxidative impurities (at least 0.01 wt % based on the polyoxyalkylene allyl ether), there is also formed a product of ascorbic or citric acid directly reacting with ≡SiH groups on the organohydrogenpolysiloxane, which can give more or less detrimental effect on the performance of the resulting polyoxyalkylene-organopolysiloxane copolymer.

U.S. Pat. No. 4,847,398, U.S. Pat. No. 5,191,193, and U.S. Pat. No. 5,159,096 describe the addition of additives such as carboxylic acid salts for enhancing reaction activity or suppressing side reactions.

However, all the foregoing methods entail cumbersome steps. Since a noticeable amount of a third substance such as solvent or additive is added, it must be removed from the product after hydrosilylation reaction by such means as stripping or filtering.

DISCLOSURE OF THE INVENTION

An object of the present invention is to provide a method for preparing a polyoxyalkylene-organopolysiloxane copolymer in a commercially advantageous manner and in high yields, wherein hydrosilylation reaction of polyoxyalkylene allyl ether with organohydrogenpolysiloxane is effected in the presence of a platinum group metal catalyst while substantially eliminating or minimizing the use of a solvent and the use of an additive other than the platinum group metal catalyst which is otherwise used for enhancing reactivity and must be removed from the system at the end of reaction, and thus eliminating removal means such as stripping or filtration.

Regarding a method for preparing a polyoxyalkylene-organopolysiloxane copolymer by reacting a polyoxyalkylene allyl ether having the general formula (1):

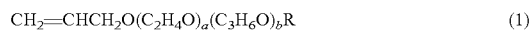

wherein R is hydrogen, a $C_1$-$C_{10}$ alkyl group, $C_1$-$C_{10}$ acyl group or $C_1$-$C_{10}$ alkenyl group, a is a number of 0 to 50, b is a number of 0 to 50, and the sum of a+b is from 1 to 100, with an organohydrogenpolysiloxane in the presence of a platinum group metal catalyst, the inventor has found that when a polyoxyalkylene allyl ether having a CPR value of less than 0.5 is used, the hydrosilylation reaction is improved such that the polyoxyalkylene-organopolysiloxane copolymer can be effectively produced in a simple manner without substantially adding a solvent and an additive which must be removed from the system at the end of reaction or while minimizing the amount of such solvent and additive and while eliminating removal means such as stripping or filtration.

Regarding the same method as above, the inventor has also found that when a polyoxyalkylene allyl ether having a CPR value of less than 5, especially from 0.5 to less than 5 is used, and prior to the addition reaction, an acid or an acid solution is added in a sufficient amount to neutralize the alkali quantity calculated from the CPR value of the polyoxyalkylene allyl ether and originating from alkaline impurities in the polyoxyalkylene allyl ether, specifically in an amount which is a 1.05 to 5 fold of a value W calculated by the equation:

$$W = 1.87 \times (C - 0.5) \times P/Y$$

wherein W is an amount (g) of acid necessary to neutralize the alkali quantity calculated from the CPR value, P is an amount (kg) of the polyoxyalkylene allyl ether used, Y is an acid value (KOH mg/g) of the acid or acid solution added, and C is the CPR value of the polyoxyalkylene allyl ether, which means that alkaline impurities are neutralized prior to the addition reaction, then the hydrosilylation reaction is improved such that the polyoxyalkylene-organopolysiloxane copolymer can be effectively produced in a simple manner as in the first embodiment.

Accordingly, the present invention provides a method for preparing a polyoxyalkylene-organopolysiloxane copolymer, comprising the step of reacting a polyoxyalkylene allyl ether having the general formula (1):

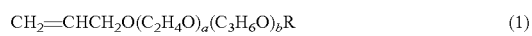

wherein R is hydrogen, a $C_1$-$C_{10}$ alkyl group, $C_1$-$C_{10}$, acyl group or $C_2$-$C_{10}$ alkenyl group, a is a number of 0 to 50, b is a number of 0 to 50, and the sum of a+b is from 1 to 100, with an organohydrogenpolysiloxane in the presence of a platinum group metal catalyst, characterized in that the polyoxyalkylene allyl ether has a CPR value of less than 0.5.

In another aspect, the present invention provides a method for preparing a polyoxyalkylene-organopolysiloxane copolymer, comprising the step of reacting a polyoxyalkylene allyl ether having the general formula (1) with an organohydrogenpolysiloxane in the presence of a platinum group metal catalyst, characterized in that the polyoxyalkylene allyl ether has a CPR value of less than 5, and prior to the reaction, an acid or an acid solution is added in a sufficient amount to neutralize the alkali quantity calculated from the CPR value.

As used herein, the term "CPR value" is a value obtained by titrating alkaline impurities in polyoxyalkylene allyl ether with hydrochloric acid according to JIS K1557 and specifically, a value which is a 10 fold of an amount (ml) of N/100 hydrochloric acid necessary to neutralize 30 g of polyoxyalkylene allyl ether.

The notation (Cn-Cm) means a group containing from n to m carbon atoms per group.

BENEFITS OF THE INVENTION

The methods for preparing polyoxyalkylene-organopolysiloxane copolymers according to the invention have several advantages. The hydrosilylation is improved in reactivity. As opposed to the prior art methods in which solvents and additives such as carboxylic acid salts are used for enhancing reactivity during the process and must be removed at the end of reaction, the inventive methods substantially eliminate the use of solvents and additives except the platinum group metal catalyst, or minimize the amounts of such solvents and additives added, and thus eliminate the step of removing such solvents and additives at the end of reaction as by stripping or filtration. Effective addition reaction can be run so that polyoxyalkylene-organopolysiloxane copolymers can be efficiently produced in a simple manner.

DESCRIPTION OF THE PREFERRED EMBODIMENTS

The method for preparing a polyoxyalkylene-organopolysiloxane copolymer according to the present invention involves the step of reacting a polyoxyalkylene allyl ether having the general formula (1) with an organohydrogenpolysiloxane in the presence of a platinum group metal catalyst.

The polyoxyalkylene allyl ether used herein has a structure of the general formula (1):

$$CH_2=CHCH_2O(C_2H_4O)_a(C_3H_6O)_bR \qquad (1)$$

wherein R is hydrogen, a $C_1$-$C_{10}$ alkyl group, $C_1$-$C_{10}$ acyl group or $C_2$-$C_{10}$ alkenyl group, a is a number of 0 to 50, b is a number of 0 to 50, and the sum of a+b is from 1 to 100.

In formula (1), R is hydrogen, a $C_1$-$C_{10}$ alkyl group, a $C_1$-$C_{10}$ acyl group or a $C_2$-$C_{10}$ alkenyl group. Suitable $C_1$-$C_{10}$ alkyl groups include methyl, ethyl, propyl, isopropyl, butyl, isobutyl, tert-butyl, pentyl, neopentyl, hexyl, cyclohexyl, and octyl. Suitable $C_1$-$C_{10}$ acyl groups include acetyl, propionyl and butyryl. Suitable $C_2$-$C_{10}$ alkenyl groups include vinyl, allyl, propenyl, isopropenyl, butenyl, hexenyl, cyclohexenyl and octenyl.

The subscript a is a number of 0 to 50, b is a number of 0 to 50, and the sum of a+b is from 1 to 100, i.e., $1 \leq a+b \leq 100$.

In the structure of polyoxyalkylene allyl ether represented by formula (1) wherein R is a hydrogen atom, $C_1$-$C_{10}$ alkyl group or $C_1$-$C_{10}$ acyl group, a functional group having an unsaturated double bond is present only at one end. The polyoxyalkylene-organopolysiloxane copolymers prepared therefrom become oily.

In the structure of polyoxyalkylene allyl ether represented by formula (1) wherein R is a $C_2$-$C_{10}$ alkenyl group, functional groups having an unsaturated double bond are present at both ends. The polyoxyalkylene-organopolysiloxane copolymers prepared therefrom may be either oily products of [AB]$_n$ type or gel products of three-dimensional structure.

The organohydrogenpolysiloxane used herein is selected from those siloxanes containing at least one, preferably 1 to 50 silicon-bonded hydrogen atoms (i.e., ≡SiH groups) per molecule, which may be linear, branched or cyclic or resinous products of two-dimensional network structure.

Of the organohydrogenpolysiloxanes, dimethylhydrogenpolysiloxane is most preferred while derivatives thereof in which some or all methyl groups are replaced by substituted or unsubstituted alkyl, aryl or alkoxy groups of 2 to less than 20 carbon atoms are also preferable.

Typical organohydrogenpolysiloxanes have the following formula:

$$H_cR^1_dSiO_{(4-c-d)/2}$$

wherein $R^1$ is each independently a substituted or unsubstituted monovalent hydrocarbon group free of aliphatic unsaturation, c and d are numbers satisfying $0<c<3$, $0 \leq d<3$, and $0<c+d \leq 3$; preferably $0<c<2$, $0.8 \leq d \leq 2$, and $0.8<c+d \leq 3$; more preferably $0.05 \leq c \leq 1$, $1.5 \leq d \leq 2$, and $1.8 \leq c+d \leq 2.7$ Suitable aliphatic unsaturation-free, substituted or unsubstituted, monovalent hydrocarbon groups of $R^1$ include those of 1 to 20 carbon atoms, more preferably 1 to 6 carbon atoms, for example, lower alkyl groups of 1 to 3 carbon atoms such as methyl, phenyl, and 3,3,3-trifluoropropyl.

Examples of the organohydrogenpolysiloxane include siloxane oligomers such as 1,1,3,3-tetramethyldisiloxane, 1,3,5,7-tetramethyltetracyclosiloxane, and 1,3,5,7,8-pentamethylpentacyclosiloxane, methylhydrogenpolysiloxane blocked with trimethylsiloxy groups at both molecular chain ends, dimethylsiloxane-methylhydrogensiloxane copolymers blocked with trimethylsiloxy groups at both molecular chain ends, dimethylpolysiloxane blocked with dimethylhydrogensiloxy groups at both molecular chain ends, methylhydrogenpolysiloxane blocked with dimethylhydrogensiloxy groups at both molecular chain ends, and dimethylsiloxane-methylhydrogensiloxane copolymers blocked with dimethylhydrogensiloxy groups at both molecular chain ends.

Also included are oxyalkylene-bearing organohydrogenpolysiloxanes such as dimethylpolysiloxane blocked with a dimethylhydrogensiloxy group at one molecular chain end and bearing an oxyalkylene group at another end, and dimethylpolysiloxane blocked with a dimethylhydrogensiloxy group at one molecular chain end and bearing an oxyalkylene group on a side chain.

These organohydrogenpolysiloxanes may be used alone or in admixture of two or more.

The organohydrogenpolysiloxane should preferably have a viscosity of 0.5 to 1,000 mm$^2$/s at 25° C., especially 5 to 500 mm$^2$/s at 25° C.

Preferably, the polyoxyalkylene allyl ether of formula (1) and the organohydrogenpolysiloxane are combined in such a proportion that the molar ratio of SiH groups on the organohydrogenpolysiloxane to alkenyl groups on the polyoxyalkylene allyl ether is from 0.1:1 to 10:1, more preferably from 0.5:1 to 5:1.

The platinum group metal catalyst may be any of catalysts well known for hydrosilylation reaction. Illustrative examples include platinum group metal elements such as platinum (inclusive of platinum black), rhodium and palladium; platinum chloride, chloroplatinic acid and chloroplatinic acid salts such as $H_2PtCl_4 \cdot nH_2O$, $H_2PtCl_6 \cdot nH_2O$, $NaHPtCl_6 \cdot nH_2O$, $KHPtCl_6 \cdot nH_2O$, $Na_2PtCl_6 \cdot nH_2O$, $K_2PtCl_4 \cdot nH_2O$, $PtCl_4 \cdot nH_2O$, $PtCl_2$, and $Na_2HPtCl_4 \cdot nH_2O$; alcohol-modified chloroplatinic acids as disclosed in U.S. Pat. No. 3,220,972; chloroplatinic acid-olefin complexes as disclosed in U.S. Pat. No. 3,159,601, U.S. Pat. No. 3,159,662, and U.S. Pat. No. 3,775,452; platinum group metals (e.g., platinum black and palladium) on supports (e.g., alumina, silica, carbon); rhodium-olefin complexes, chlorotris(triphenylphosphine)rhodium, known as Wilkinson catalyst; and complexes of platinum chloride, chloroplatinic acid and chloroplatinic acid salts with vinyl-bearing siloxanes, typically vinyl-bearing cyclic siloxanes. Also useful are platinum fine powder, platinum powder on supports (e.g., alumina, silica gel, asbestos), chloroplatinic acid, and complexes of chloroplatinic acid with alcohols, ethers or aldehydes. On use, the platinum or platinum compounds may be dissolved or dispersed in organic solvents such as isopropanol, ethanol, benzene, toluene and xylene or organopolysiloxane fluids in order to improve the dispersion in the reaction system.

Of the platinum group metal catalysts used herein, neutral platinum group metal complexes are desirable. By the term "neutral," it is meant that the catalyst does not substantially contain chlorine atoms. It is noted that in the presence of chloroplatinic acid as commonly used, there is a possibility that side reactions other than hydrosilylation, for example, dehydrogenation reaction with alcoholic compounds in the system take place. Preferred examples of neutral platinum group metal complexes are platinum-alkenylsiloxane complexes, with platinum-vinylsiloxane complexes being most preferred.

An amount of the platinum group metal catalyst used may be determined as appropriate and is usually in the range of 0.5 to 1,000 ppm (parts per million), especially 1 to 100 ppm of metal, based on the total weight of the polyoxyalkylene allyl ether and organohydrogenpolysiloxane combined.

According to the present invention, the method for preparing a polyoxyalkylene-organopolysiloxane copolymer by reacting a polyoxyalkylene allyl ether with an organohydrogenpolysiloxane in the presence of a platinum group metal catalyst, all as defined above, can be implemented as a first embodiment (i) or a second embodiment (ii).

First embodiment (i) uses a polyoxyalkylene allyl ether having a CPR value of less than 0.5.

Second embodiment (ii) uses a polyoxyalkylene allyl ether having a CPR value of less than 5, and adds to the reaction system an acid or an acid solution in a sufficient amount to neutralize the alkali quantity calculated from the CPR value for thereby neutralizing alkaline impurities in the system prior to effecting the addition reaction.

As noted above, the term "CPR value" is a value obtained by titrating alkaline impurities in polyoxyalkylene allyl ether with hydrochloric acid according to JIS K1557. Specifically, CPR value is equal to a 10 fold of an amount (ml) of N/100 hydrochloric acid necessary to neutralize 30 g of polyoxyalkylene allyl ether.

In the first embodiment, a polyoxyalkylene allyl ether having a CPR value of less than 0.5 is used. The lower the CPR value, the better become the results. CPR values of less than 0.2 are more preferred. The use of a polyoxyalkylene allyl ether having a CPR value of less than 0.5, that is, a lower content of alkaline impurities leads to improved reactivity of hydrosilylation, enabling preparation of polyoxyalkylene-organopolysiloxane copolymers without a need for solvents or other additives. No satisfactory reactivity improvement is achieved at a CPR value equal to or more than 0.5.

If a polyoxyalkylene allyl ether has a CPR value of more than 0.5, it may be previously treated with adsorbents such as activated carbon or neutralized with acids such as hydrochloric acid. Through such pretreatment, the CPR value of polyoxyalkylene allyl ether can be reduced to less than 0.5.

In the second embodiment, a polyoxyalkylene allyl ether having a CPR value of less than 5 is used, with a CPR value of 0.5 to less than 5 being preferred, and a CPR value of 0.5 to less than 1 being most preferred. In the event the CPR value is more than 5, an acid is added in a sufficient amount to neutralize the alkali quantity calculated from the CPR value, and then hydrosilylation reaction will take place, but side reactions can occur due to the acid added, compromising the inherent performance of the polyoxyalkylene-organopolysiloxane copolymer.

As noted in the first embodiment, in the event a polyoxyalkylene allyl ether has a CPR value in excess of 0.5, the CPR value can be reduced by treating with adsorbents such as activated carbon or neutralizing with acids such as hydrochloric acid. Such pretreatment is not needed in the second embodiment, and instead, an acid or an acid solution is added to the reaction system prior to the hydrosilylation reaction, in a sufficient amount to neutralize the alkali quantity calculated from the CPR value for thereby improving the reactivity of hydrosilylation likewise. Specifically, the system is charged with polyoxyalkylene allyl ether and organohydrogenpolysiloxane and also with a sufficient amount as specified above of acid or acid solution before a platinum group metal catalyst is added for hydrosilylation reaction to occur.

The acid used herein is not particularly limited. Examples include mineral acids such as hydrochloric acid, sulfuric acid and nitric acid and organic acids such as acetic acid, citric acid, oxalic acid, malic acid, and succinic acid, which may be used alone or in admixture of two or more. Of these acids, carboxylic acids are preferred. More preferred is a carboxylic acid selected from among acetic acid, citric acid, oxalic acid, malic acid, and succinic acid. An organic acid selected from among citric acid, oxalic acid, malic acid, and succinic acid is most preferred because of less odor and ease of handling.

The acid may be used in solution form. The solvent in which the acid is dissolved is not particularly limited although water, alcohols and mixtures thereof are desired for ease of handling and cost.

In the second embodiment, a sufficient amount to neutralize the alkali quantity calculated from the CPR value is based on an amount W of acid necessary to neutralize the alkali quantity, as calculated by the equation:

$$W = 1.87 \times (C - 0.5) \times P/Y$$

wherein W is an amount (g) of acid necessary to neutralize the alkali quantity calculated from the CPR value, P is an amount (kg) of the polyoxyalkylene allyl ether used, Y is an acid value (KOH mg/g) of the acid or acid solution added, and C is the CPR value of the polyoxyalkylene allyl ether.

In the second embodiment, an actual amount of acid or acid solution added corresponding to a sufficient amount to neutralize the alkali quantity calculated from the CPR value is desirably a 1.05 to 5 fold, more desirably a 1.1 to 2 fold of the amount W of acid necessary to neutralize the alkali quantity as calculated by the above equation. An amount of acid or acid solution which is less than a 1.05 fold of W may fail to achieve a satisfactory improvement in the reactivity of hydrosilylation whereas an amount of acid or acid solution which is more than a 5 fold of W may allow the extra acid to react with the organohydrogenpolysiloxane to form a reaction product which can have an impact on the desired properties of the polyoxyalkylene-organopolysiloxane copolymer.

In both the first and second embodiments, hydrosilylation reaction is desirably effected in the substantial absence of a solvent and in a substantially oxygen gas-free atmosphere.

As used herein, the substantial absence of a solvent means not adding a solvent for compatibilization between the reactants, polyoxyalkylene allyl ether and organohydrogenpolysiloxane. It is thus acceptable that a minor amount of a solvent having the catalyst or acid dissolved therein is present in the system. Specifically, the content of solvent in the entire reaction system is preferably equal to or less than 2% by weight, more preferably equal to or less than 1% by weight.

Also, the substantially oxygen gas-free atmosphere denotes an atmosphere that prevents the reactant, polyoxyalkylene allyl ether from oxidation. Specifically, the content of oxygen gas in the entire reaction system is preferably equal to or less than 1% by weight. Such an atmosphere may be arrived at by any means as long as it is an oxygen-free inert gas atmosphere. Typically, prior to the start of reaction, the system is evacuated, preferably to a vacuum of about 10 mmHg, for removing the dissolved oxygen. Alternatively, prior to the start of reaction, nitrogen gas is passed over or bubbled into the reaction liquid at a flow rate of about 0.1 to 2 liter/hour per liter of the reactor vessel for about 0.5 hour to about 3 hours.

The reaction conditions may be the same as in ordinary hydrosilylation processes. Preferably the system is heated at a temperature of about 50 to 100° C. for about 30 minutes to about 5 hours. After the completion of reaction, heating is ceased. The system is allowed to cool, obtaining the desired polyoxyalkylene-organopolysiloxane copolymer.

EXAMPLE

Examples and Comparative Examples are given below for further illustrating the invention although the invention is not limited thereto. Described below are the measurement of CPR of polyoxyalkylene allyl ether, the identification of substances used, and the evaluation of reaction products.

(i) Measurement of CPR of Polyoxyalkylene Allyl Ether

Approximately 30 g of a sample was accurately (within 0.1 g) weighed and thoroughly dissolved in 100 ml of methanol. This was followed by potentiometric titration with N/100 hydrochloric acid using a pH meter. A blank test was carried out under the same conditions. CPR was computed according to the equation:

$$CPR = 10 \times (A-B) \times f$$

wherein A is a volume (ml) of N/100 hydrochloric acid required for sample titration, B is a volume (ml) of N/100 hydrochloric acid required for blank test titration, and f is a factor of N/100 hydrochloric acid.

(ii) Substances Used

The polyoxyalkylene allyl ethers, organohydrogenpolysiloxanes and catalyst used are identified below.

Polyoxyalkylene Allyl Ether

| | CPR |
|---|---|
| (A-1) $CH_2=CHCH_2O(C_2H_4O)_9H$ | 0.2 |
| (A-2) $CH_2=CHCH_2O(C_2H_4O)_9H$ | 1.2 |
| (A-3) $CH_2=CHCH_2O(C_2H_4O)_9H$ | 4.9 |
| (B-1) $CH_2=CHCH_2O(C_2H_4O)_{23}(C_3H_6O)_{23}CH_3$ | 0.4 |
| (B-2) $CH_2=CHCH_2O(C_2H_4O)_{23}(C_3H_6O)_{23}CH_3$ | 1.7 |
| (C-1) $CH_2=CHCH_2O(C_2H_4O)_9COCH_3$ | 0.5 |
| (C-2) $CH_2=CHCH_2O(C_2H_4O)_9COCH_3$ | 3.7 |

Dimethylhydrogenpolysiloxane

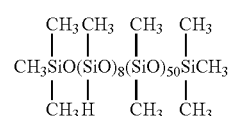

(a)

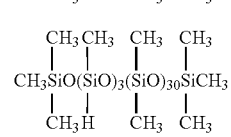

(b)

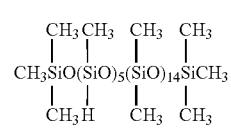

(c)

Catalyst a neutral platinum complex having 1,3-divinyl-1,1,3,3-tetramethyldisiloxane as ligand in toluene (platinum 0.5% by weight)

(iii) Evaluation of reaction product (1) Measurement of Percent Conversion

A percent conversion was determined by utilizing the hydrogen gas generated as a result of an organohydrogenpolysiloxane readily reacting with alkaline water. The conversion is calculated as conversion = $(1-y/x) \times 100\%$ wherein x is an amount (ml/g) of hydrogen gas generated from the liquid charge prior to reaction and y is an amount (ml/g) of hydrogen gas generated from the solution after reaction.

The amount of hydrogen gas generated was determined by reacting a solution of a sample in n-butyl alcohol with a 10 wt % caustic soda solution at room temperature and collecting the hydrogen gas generated in a graduated burette.

(2) Viscosity of Reaction Liquid

Measured by a Cannon-Fenske capillary viscometer (Sibata Scientific Technology Ltd.)

Example 1

Using Polyoxyalkylene Allyl Ether with CPR=0.2, and not Adding Acid or Acid Solution A separable flask (internal volume 5 L) equipped with a heater/oil bath, stirrer, gas flow tube and thermometer was sequentially charged with 1,600 g of dimethylhydrogenpolysiloxane (a) and 2,000 g of polyoxyalkylene allyl ether (A-1). With stirring, nitrogen gas was blown at a rate of 1 L/hr (as calculated in the standard state) for one hour through the gas flow tube inserted into the liquid. In this state, 2.0 g of the catalyst, i.e., toluene solution (platinum 0.5% by weight) of a neutral platinum complex having 1,3-divinyl-1,1,3,3-tetramethyldisiloxane as ligand was added, and heating was started so that a constant temperature of 90° C.±5° C. was reached after 30 minutes. After 180 minutes from the start of heating, the heater was shut off. The flask was allowed to cool, obtaining a polyoxyalkylene-organopolysiloxane copolymer.

The amount of hydrogen gas generated before the start of heating was 18.5 ml/g, and the amount of hydrogen gas generated after cooling was 0.38 ml/g. From these data, a percent conversion was determined to be 97.9%. The polyoxyalkylene-organopolysiloxane copolymer produced had a viscosity of 1,050 mm$^2$/s. It looked a pale yellow clear liquid.

Example 2

Using Polyoxyalkylene Allyl Ether with CPR=1.2, and Adding Acid or Acid Solution A separable flask (internal volume 5 L) equipped with a heater/oil bath, stirrer, gas flow tube and thermometer was sequentially charged with 1,600 g of dimethylhydrogenpolysiloxane (a), 2,000 g of polyoxyalkylene allyl ether (A-2), and 0.12 g of a 10% ethanol solution of malic acid (acid value 83.6 KOH mg/g). With stirring, nitrogen gas was blown at a rate of 1 L/hr (as calculated in the standard state) for one hour through the gas flow tube inserted into the liquid. In this state, 2.0 g of the catalyst, i.e., toluene solution (platinum 0.5% by weight) of a neutral platinum complex having 1,3-divinyl-1,1,3,3-tetramethyldisiloxane as ligand was added, and heating was started so that a constant temperature of 90° C.±5° C. was reached after 30 minutes. After 180 minutes from the start of heating, the heater was shut off. The flask was allowed to cool, obtaining a polyoxyalkylene-organopolysiloxane copolymer.

The amount of hydrogen gas generated before the start of heating was 18.5 ml/g, and the amount of hydrogen gas generated after cooling was 0.28 ml/g. From these data, a percent conversion was determined to be 98.5%. The polyoxyalkylene-organopolysiloxane copolymer produced had a viscosity of 1,072 mm$^2$/s. It looked a pale yellow clear liquid.

Comparative Example 1

Using Polyoxyalkylene Allyl Ether with CPR=1.2, and Not Adding Acid or Acid Solution The same procedure as in Example 2 was repeated aside from omitting the 10% ethanol solution of malic acid, obtaining a polyoxyalkylene-organopolysiloxane copolymer.

The amount of hydrogen gas generated before the start of heating was 18.5 ml/g, and the amount of hydrogen gas generated after cooling was 9.09 ml/g. From these data, a percent conversion was determined to be 50.9%. The polyoxyalkylene-organopolysiloxane copolymer produced was a white turbid liquid, indicating retarded hydrosilylation reaction.

Example 3

Using Polyoxyalkylene Allyl Ether with CPR=4.9, and Adding Acid or Acid Solution A separable flask (internal volume 5 L) equipped with a heater/oil bath, stirrer, gas flow tube and thermometer was sequentially charged with 1,600 g of dimethylhydrogenpolysiloxane (a), 2,000 g of polyoxyalkylene allyl ether (A-3), and 0.51 g of a 10% ethanol solution of malic acid. With stirring, nitrogen gas was blown at a rate of 1 L/hr (as calculated in the standard state) for one hour through the gas flow tube inserted into the liquid. In this state, 2.0 g of the catalyst, i.e., toluene solution (platinum 0.5% by weight) of a neutral platinum complex having 1,3-divinyl-1,1,3,3-tetramethyldisiloxane as ligand was added, and heating was started so that a constant temperature of 90° C.±5° C. was reached after 30 minutes. After 180 minutes from the start of heating, the heater was shut off. The flask was allowed to cool, obtaining a polyoxyalkylene-organopolysiloxane copolymer.

The amount of hydrogen gas generated before the start of heating was 18.5 ml/g, and the amount of hydrogen gas generated after cooling was 0.724 ml/g. From these data, a percent conversion was determined to be 96.1%. The polyoxyalkylene-organopolysiloxane copolymer produced had a viscosity of 1,021 mm$^2$/s. It looked a pale yellow clear liquid.

Example 4

Using Polyoxyalkylene Allyl Ether with CPR=4.9, and Adding Acid or Acid Solution The same procedure as in Example 3 was repeated except that the amount of the 10% ethanol solution of malic acid was changed from 0.51 g to 0.49 g, obtaining a polyoxyalkylene-organopolysiloxane copolymer.

The amount of hydrogen gas generated before the start of heating was 18.5 ml/g, and the amount of hydrogen gas generated after cooling was 0.574 ml/g. From these data, a percent conversion was determined to be 96.9%. The polyoxyalkylene-organopolysiloxane copolymer produced had a viscosity of 1,110 mm$^2$/s. It looked a pale yellow clear liquid.

Comparative Example 2

Using Polyoxyalkylene Allyl Ether with CPR=4.9, and Not Adding Acid or Acid Solution The same procedure as in Example 4 was repeated aside from omitting the 10% ethanol solution of malic acid.

The amount of hydrogen gas generated before the start of heating was 18.5 ml/g, and the amount of hydrogen gas generated after cooling was 14.5 ml/g. From these data, a percent conversion was determined to be 21.6%. The polyoxyalkylene-organopolysiloxane copolymer produced was a white turbid liquid, indicating retarded hydrosilylation reaction.

Example 5

Using Polyoxyalkylene Allyl Ether with CPR=0.4, and Not Adding Acid or Acid Solution A separable flask (internal volume 5 L) equipped with a heater/oil bath, stirrer, gas flow tube and thermometer was sequentially charged with 680 g of dimethylhydrogenpolysiloxane (b) and 3,000 g of polyoxyalkylene allyl ether (B-1). With stirring, nitrogen gas was blown at a rate of 1 L/hr (as calculated in the standard state) for one hour through the gas flow tube inserted into the liquid. In this state, 2.0 g of the catalyst, i.e., toluene solution (platinum 0.5% by weight) of a neutral platinum complex having 1,3-divinyl-1,1,3,3-tetramethyldisiloxane as ligand was added, and heating was started so that a constant temperature of 90° C.±5° C. was reached after 30 minutes. After 180 minutes from the start of heating, the heater was shut off. The flask was allowed to cool, obtaining a polyoxyalkylene-organopolysiloxane copolymer.

The amount of hydrogen gas generated before the start of heating was 4.98 ml/g, and the amount of hydrogen gas generated after cooling was 0.11 ml/g. From these data, a percent conversion was determined to be 97.8%. The polyoxyalkylene-organopolysiloxane copolymer produced had a viscosity of 1,850 mm²/s. It looked a pale yellow clear liquid.

Example 6

Using Polyoxyalkylene Allyl Ether with CPR=1.7, and Adding Acid or Acid Solution A separable flask (internal volume 5 L) equipped with a heater/oil bath, stirrer, gas flow tube and thermometer was sequentially charged with 680 g of dimethylhydrogenpolysiloxane (b), 3,000 g of polyoxyalkylene allyl ether (B-2), and 0.30 g of a 10% ethanol solution of malic acid. With stirring, nitrogen gas was blown at a rate of 1 L/hr (as calculated in the standard state) for one hour through the gas flow tube inserted into the liquid. In this state, 2.0 g of the catalyst, i.e., toluene solution (platinum 0.5% by weight) of a neutral platinum complex having 1,3-divinyl-1,1,3,3-tetramethyldisiloxane as ligand was added, and heating was started so that a constant temperature of 90° C.±5° C. was reached after 30 minutes. After 180 minutes from the start of heating, the heater was shut off. The flask was allowed to cool, obtaining a polyoxyalkylene-organopolysiloxane copolymer.

The amount of hydrogen gas generated before the start of heating was 4.98 ml/g, and the amount of hydrogen gas generated after cooling was 0.18 ml/g. From these data, a percent conversion was determined to be 96.4%. The polyoxyalkylene-organopolysiloxane copolymer produced had a viscosity of 1,772 mm²/s. It looked a pale yellow clear liquid.

Comparative Example 3

Using Polyoxyalkylene Allyl Ether with CPR=1.7, and Not Adding Acid or Acid Solution The same procedure as in Example 6 was repeated aside from omitting the 10% ethanol solution of malic acid, obtaining a polyoxyalkylene-organopolysiloxane copolymer.

The amount of hydrogen gas generated before the start of heating was 4.98 ml/g, and the amount of hydrogen gas generated after cooling was 1.22 ml/g. From these data, a percent conversion was determined to be 75.5%. The polyoxyalkylene-organopolysiloxane copolymer produced was a white turbid liquid, indicating retarded hydrosilylation reaction.

Example 7

Using Polyoxyalkylene Allyl Ether with CPR=0.5, and Adding Acid or Acid Solution A separable flask (internal volume 5 L) equipped with a heater/oil bath, stirrer, gas flow tube and thermometer was sequentially charged with 1,520 g of dimethylhydrogenpolysiloxane (c) and 1,900 g of polyoxyalkylene allyl ether (C-1), and 0.05 g of a 10% ethanol solution of malic acid. With stirring, nitrogen gas was blown at a rate of 1 L/hr (as calculated in the standard state) for one hour through the gas flow tube inserted into the liquid. In this state, 2.0 g of the catalyst, i.e., toluene solution (platinum 0.5% by weight) of a neutral platinum complex having 1,3-divinyl-1,1,3,3-tetramethyldisiloxane as ligand was added, and heating was started so that a constant temperature of 90° C.±5° C. was reached after 30 minutes. After 180 minutes from the start of heating, the heater was shut off. The flask was allowed to cool, obtaining a polyoxyalkylene-organopolysiloxane copolymer.

The amount of hydrogen gas generated before the start of heating was 34.4 ml/g, and the amount of hydrogen gas generated after cooling was 1.69 ml/g. From these data, a percent conversion was determined to be 95.1%. The polyoxyalkylene-organopolysiloxane copolymer produced had a viscosity of 311 mm²/s. It looked a pale yellow clear liquid.

Example 8

Using Polyoxyalkylene Allyl Ether with CPR=3.7, and Adding Acid or Acid Solution A separable flask (internal volume 5 L) equipped with a heater/oil bath, stirrer, gas flow tube and thermometer was sequentially charged with 1,520 g of dimethylhydrogenpolysiloxane (c), 1,900 g of polyoxyalkylene allyl ether (C-2), and 0.30 g of a 10% ethanol solution of malic acid. With stirring, nitrogen gas was blown at a rate of 1 L/hr (as calculated in the standard state) for one hour through the gas flow tube inserted into the liquid. In this state, 2.0 g of the catalyst, i.e., toluene solution (platinum 0.5% by weight) of a neutral platinum complex having 1,3-divinyl-1,1,3,3-tetramethyldisiloxane as ligand was added, and heating was started so that a constant temperature of 90° C.±5° C. was reached after 30 minutes. After 180 minutes from the start of heating, the heater was shut off. The flask was allowed to cool, obtaining a polyoxyalkylene-organopolysiloxane copolymer.

The amount of hydrogen gas generated before the start of heating was 34.4 ml/g, and the amount of hydrogen gas generated after cooling was 0.73 ml/g. From these data, a percent conversion was determined to be 97.9%. The polyoxyalkylene-organopolysiloxane copolymer produced had a viscosity of 321 mm²/s. It looked a pale yellow clear liquid.

Comparative Example 4

Using Polyoxyalkylene Allyl Ether with CPR=3.7, and Not Adding Acid or Acid Solution The same procedure as in Example 8 was repeated aside from omitting the 10% ethanol solution of malic acid, obtaining a polyoxyalkylene-organopolysiloxane copolymer.

The amount of hydrogen gas generated before the start of heating was 34.4 ml/g, and the amount of hydrogen gas generated after cooling was 29.1 ml/g. From these data, a percent conversion was determined to be 15.4%. The polyoxyalkylene-organopolysiloxane copolymer produced was a white turbid liquid, indicating retarded hydrosilylation reaction.

Japanese Patent Application No. 2005-083702 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing a polyoxyalkylene-organopolysiloxane copolymer, comprising the steps of neutralizing a polyoxyalkylene allyl ether having the general formula (1):

$$CH_2=CHCH_2O(C_2H_4O)_a(C_3H_6O)_bR \qquad (1)$$

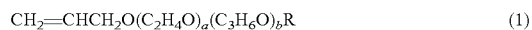

wherein R is hydrogen, a $C_1$-$C_{10}$ alkyl group, $C_1$-$C_{10}$ acyl group or $C_2$-$C_{10}$ alkenyl group, a is a number of 0 to 50, b is a number of 0 to 50, and the sum of a+b is from 1 to 100, said polyoxyalkylene allyl ether having a CPR value of more than 0.5, with an acid selected from the group consisting of hydrochloric acid, sulfuric acid, nitric acid, acetic acid, oxalic acid, malic acid, and succinic acid, to form a polyoxyalkylene allyl ether having a CPR value of less than 0.5, and then reacting the polyoxyalkylene allyl ether group having a CPR value of less than 0.5, in the substantial absence of a solvent and in a substantially oxygen gas-free atmosphere, with an organohydrogenpolysiloxane in the presence of a platinum group metal catalyst to form said polyoxyalkylene-organopolysiloxane copolymer.

2. The method of claim 1 wherein said catalyst is a neutral platinum group metal complex.

3. The method of claim 1, wherein a polyoxyalkylene allyl ether having the formula (A-2):

  (A-2), said polyoxyalkylene allyl ether having a CPR value of 1.2, is neutralized with malic acid to form a polyoxyalkylene allyl ether having a CPR value of less than 0.5, and then the polyoxyalkylene allyl ether group having a CPR value of less than 0.5 is reacted, in the substantial absence of a solvent and in a substantially oxygen gas-free atmosphere, with an organohydrogenpolysiloxane of the formula $(CH_3)_3SiO[H(CH_3)SiO]_8[(CH_3)_2SiO]_{50}SiO(CH_3)_3$ in the presence of a neutral platinum complex having 1,3-divinyl-1,1,3,3-tetramethyldisiloxane as a ligand to form said polyoxyalkylene-organopolysiloxane copolymer.

4. A method for preparing a polyoxyalkylene-organopolysiloxane copolymer, comprising the steps of adding an acid selected from the group consisting of hydrochloric acid, sulfuric acid, nitric acid, acetic acid, oxalic acid, malic acid, and succinic acid or a solution of the acid to a polyoxyalkylene allyl ether having the general formula (1):

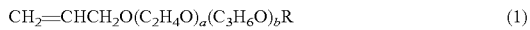  (1)

wherein R is hydrogen, a $C_1$-$C_{10}$ alkyl group, $C_1$-$C_{10}$ acyl group or $C_2$-$C_{10}$ alkenyl group, a is a number of 0 to 50, b is a number of 0 to 50, and the sum of a+b is from 1 to 100, said ether having a CPR value of 0.5 to less than 5, in a sufficient amount to neutralize an alkali quantity calculated from the CPR value, and reacting the neutralized polyoxyalkylene allyl ether with an organohydrogenpolysiloxane in the presence of a platinum group metal catalyst in the substantial absence of a solvent and in a substantially oxygen gas-free atmosphere.

5. The method of claim 4 wherein said catalyst is a neutral platinum group metal complex.

6. The method of claim 4 wherein the acid is a carboxylic acid.

7. The method of claim 6 wherein the acid is at least one carboxylic acid selected from the group consisting of acetic acid, oxalic acid, succinic acid, and malic acid.

8. The method of claim 4, wherein the amount of acid employed to neutralize the alkali quantity is an amount which is 1.05 to 5 times a value W calculated by the equation:

$$W = 1.87 \times (C - 0.5) \times P/Y$$

wherein W is an amount (g) of acid necessary to neutralize the alkali quantity calculated from the CPR value, P is an amount (kg) of the polyoxyalkylene allyl ether used, Y is an acid value (KOH mg/g) of the acid or acid solution added, and C is the CPR value of the polyoxyalkylene allyl ether.

* * * * *